Figure 1:
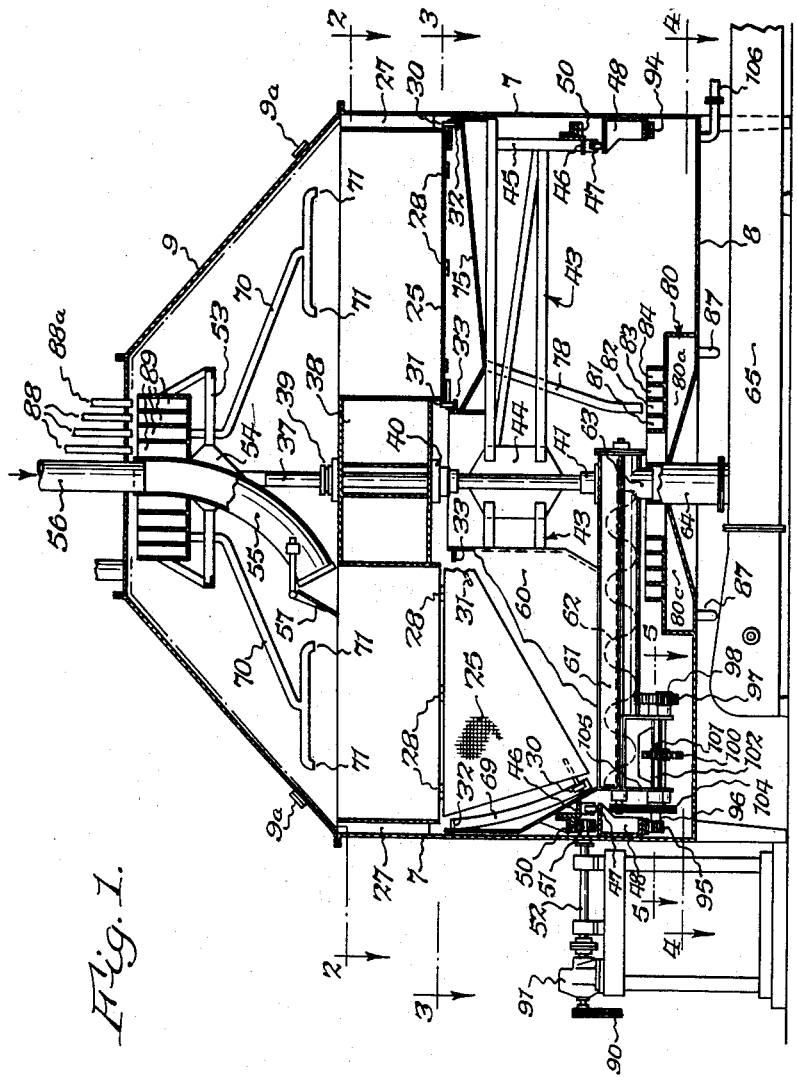

Dec. 10, 1963

C. B. UPTON 3,113,954

OIL SOLVENT EXTRACTION METHOD

Original Filed Dec. 17, 1957

3 Sheets-Sheet 2

INVENTOR.
Charles B. Upton,
BY
ATTORNEYS

Dec. 10, 1963 C. B. UPTON 3,113,954
OIL SOLVENT EXTRACTION METHOD
Original Filed Dec. 17, 1957 3 Sheets-Sheet 3

INVENTOR.
Charles B. Upton
BY
ATTORNEYS

United States Patent Office 3,113,954
Patented Dec. 10, 1963

3,113,954
OIL SOLVENT EXTRACTION METHOD
Charles B. Upton, Piqua, Ohio, assignor to The French Oil Mill Machinery Company, Piqua, Ohio
Original application Dec. 17, 1957, Ser. No. 703,368, now Patent No. 3,021,201, dated Feb. 13, 1962. Divided and this application May 10, 1961, Ser. No. 109,096
4 Claims. (Cl. 260—412.8)

This invention relates to a continuous solvent extraction process for the leaching of oils and other soluble materials from solids. This process can be applied to the leaching of any soluble material from a solid, using a liquid solvent, but has been particularly developed for the extraction of oil and fats from vegetable and animal materials.

This application is a division of my original application Ser. No. 703,368, filed Dec. 17, 1957, now Patent No. 3,021,201, and entitled Solvent Extraction Apparatus and Method.

Solvent extractors are generally divided into two classes. The first involves percolation of the liquid through the solid and the second class involves immersion of the solid in the liquid. My invention relates particularly to a percolation type of extractor and extraction system, but may be employed in connection with immersion of the solids in the solvent. Many variations in the percolation type of extractor have been used. The most common is a continuous basket extractor in which baskets or compartments are filled with solid material and move through a continuous system. When these extractors are built in larger sizes the design of structural support for the extractors and of bearings becomes more and more expensive. Furthermore in extractors in which the containers for the solid material move, the material in the containers is subject to a certain amount of vibration or agitation which releases some solid material in the form of fines from the bulk of the material and which then passes into the miscella.

One of the objects of this invention is to provide an extracting process of this type in which the flakes or solids to be extracted are charged into stationary baskets or cells in which they remain completely at rest throughout the extraction cycle until they are discharged, so that the fine particles of the solids or flakes remain in the baskets or cells and form a filter bed for the solvent and miscella passing through the same, thus producing a miscella containing fewer fines.

It is also an object to provide a process of this type in which sprays are provided for subjecting the solid material to solvents of successive strengths, and to collect from the baskets or cells miscella which has passed through the solid material.

Another object is to provide a process of this type in which the movable frame or carriage when receiving the extracted solids immediately discharges the same from the apparatus so that only a part of the weight of these solids is momentarily supported by the movable frame or carriage.

Other objects and advantages will be apparent from the following description of some embodiments of the invention, and the novel features will be particularly pointed out hereinafter in connection with the appended claims.

In the accompanying drawings which illustrate by way of example one embodiment of this invention:

FIG. 1 is a central, sectional elevation of a solvent extraction apparatus embodying this invention.

Figure 2:
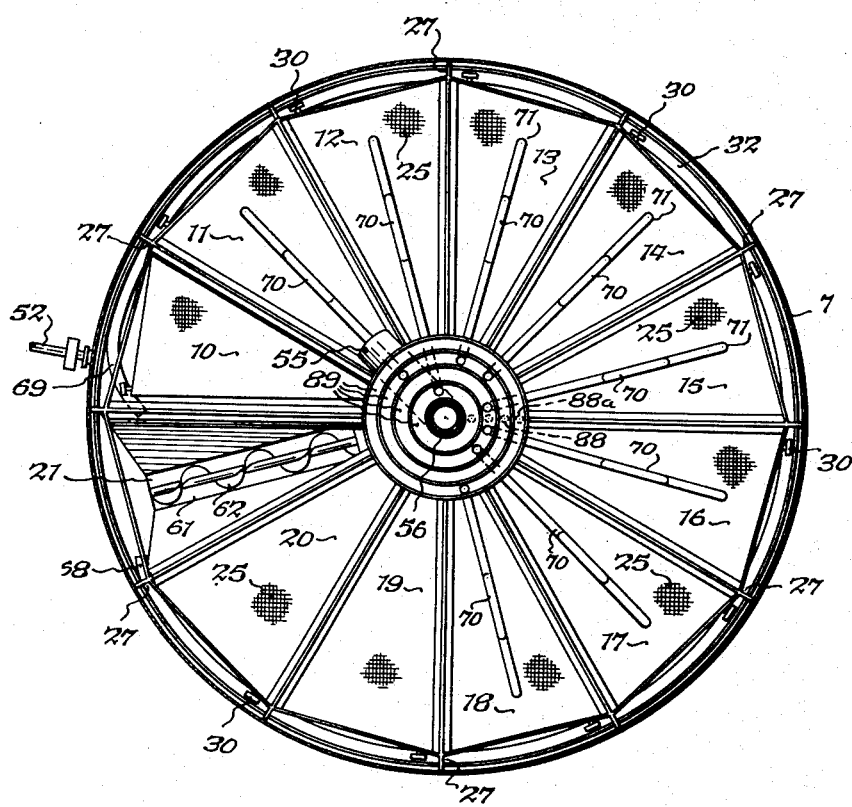
Figure 3:
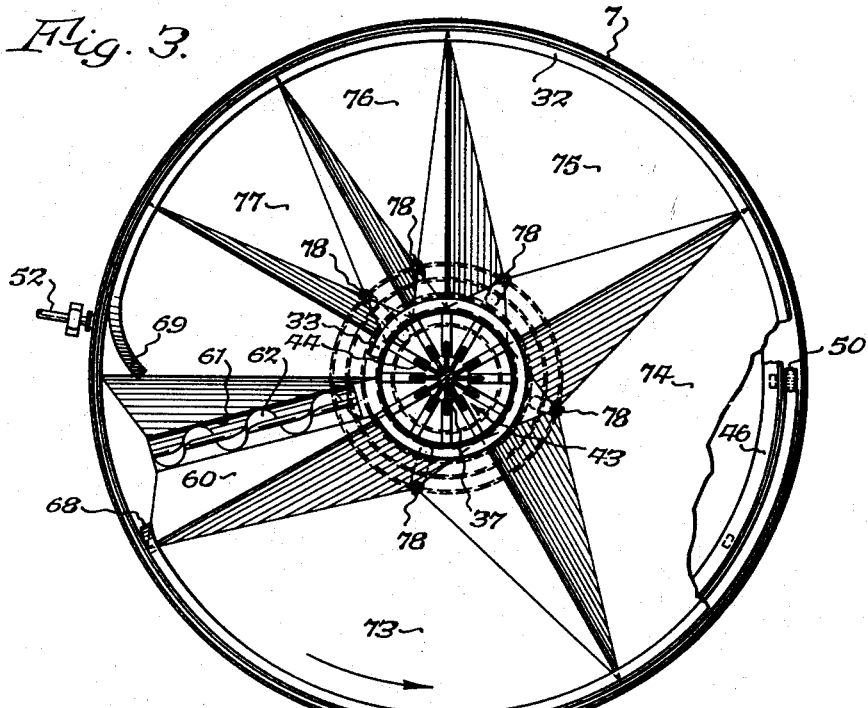
Figure 4:
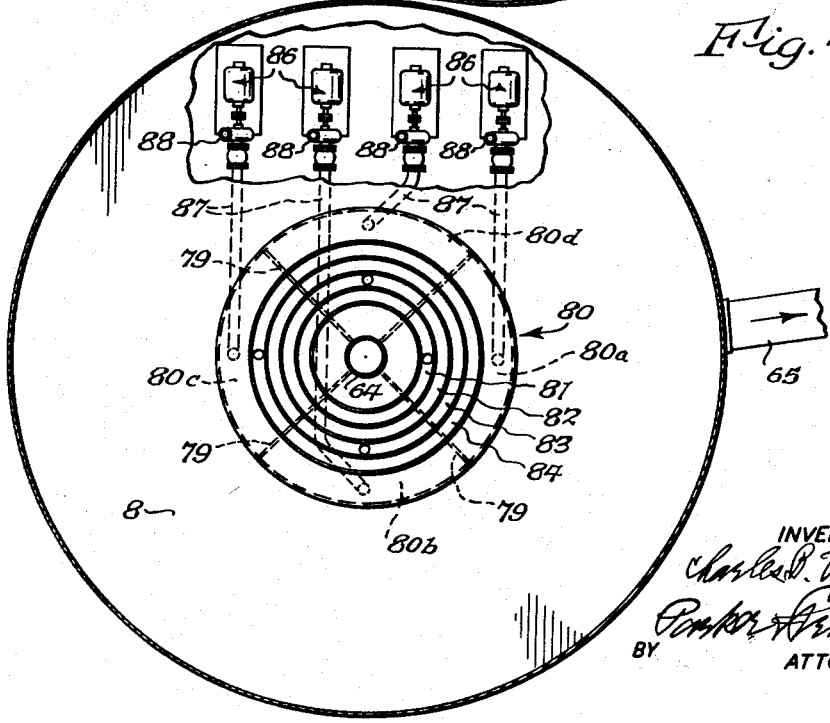

FIGS. 2, 3 and 4 are horizontal, sectional views thereof respectively on lines 2—2, 3—3 and 4—4, FIG. 1.

Figure 5:
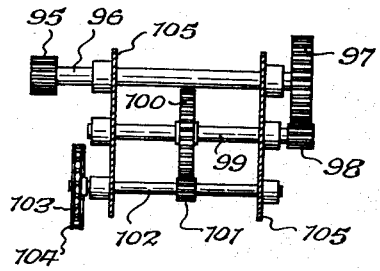

FIG. 5 is a fragmentary, sectional view thereof on line 5—5, FIG. 1.

*General Construction*

The process embodying this invention may best be carried out by means of apparatus of the type herein illustrated which includes an outer wall 7 which in the construction illustrated is approximately cylindrical and is connected with a bottom 8. The upper end of the side wall 7 is closed by means of a dome or cover 9 which may be provided with sight glasses 9a through which the operation of the apparatus may be observed, and with a manhole and cover (not shown).

Within the housing is arranged a series of stationary baskets or cells 10–21 which are the containers for the material to be treated. These baskets or cells are arranged in an endless path, for example in a circle, in the particular construction illustrated, and they are of sector shape and each has a perforate bottom 25. These baskets or cells are rigidly mounted on the stationary housing of the apparatus, for example, by means of radially extending plates or bars 27 which have their outer ends welded or otherwise secured to the side wall 7 of the apparatus. The baskets have radially extending side walls and end walls and the bottoms 25 of sector shape are each hinged at one side thereof to a side wall of a basket, as indicated at 28. The edge of each bottom opposite to that which is hinged is provided with rollers 30 and 31 arranged to roll on suitable guide tracks or cams 32 and 33.

The means for filling and emptying the containers and for treatment of the material in the baskets are mounted on a rotatable frame or carriage within the housing of the apparatus. Since the apparatus shown in the drawings has the containers arranged in a circular path, the frame or carriage also moves in a similar path concentric with the path about which the containers are arranged, but it will be understood that it is not intended to limit this invention to apparatus in which the containers are arranged in a circular path. In the particular construction shown for this purpose this frame is mounted on an upright rotary column or shaft 37 which is suitably journalled in the apparatus in any desired manner. In the construction illustrated the stationary mounting for the containers includes a drum shaped central portion 38 to which the inner ends of the stationary containers are connected. The shaft 37 is journalled on this central portion 38 and for that purpose is provided with suitable bearings 39 and 40 secured respectively to the upper and lower surfaces of the stationary frame portion 38. The lower end of this shaft may also have a flanged sleeve 41 secured thereto and which is secured to a conveyor housing to be hereinafter described and which also rotates with the frame or carriage of the apparatus.

The movable frame or carriage has a plurality of radially extending arms in the form of structural members or beams 43 which may be rigidly of any desired construction. The inner ends of these beams are secured to plates 44 welded or otherwise mounted on the shaft or column 37 and the outer ends of these arms have upright legs 45 rigidly secured thereto. Preferably the lower ends of these legs are secured to an annular frame member 46 which may be of angle shaped cross section. Wheels or rollers 47 pivoted on brackets secured to the frame member 46 at intervals are positioned to roll on an annular flange or structural member 48 secured to the side wall 7.

Rotary motion may be imparted to the frame or carriage by any suitable mechanism. For example in the construction shown the annular frame member 46 has an annular rack 50 suitably mounted thereon. This rack meshes with a pinion 51 mounted on the end of a shaft 52 which may be driven in any suitable manner and which extends through the wall 7 of the apparatus.

The rotary frame or carriage also includes a part mounted on the shaft 37 above the bearings 39 and 40. This upper part of the carriage includes supporting brackets 53 secured to a plate 54 which in turn is secured to the shaft 37.

The supply of material to be treated in the various baskets or containers is effected by means of a discharge nozzle 55 which is suitably secured to the upper part of the revolving carriage. This nozzle has the upper end thereof arranged centrally with reference to the rotary carriage and telescopically connects with a stationary spout 56 to which material to be treated is supplied to the apparatus, preferably in the form of a slurry of flakes or ground material and a solvent or miscella. The nozzle 55 is curved so that the lower end thereof will be arranged over the inner portions of the containers for the material. Preferably a diverter plate 57 is pivoted on the discharge end of the nozzle 55 and is adjustable thereon so as to direct the material into the containers to fill them to approximately uniform height.

After the material in the stationary containers has been treated by means of solvents, these extracted solids are dumped into a hopper 60 carried by the revolving frame or carriage. The lower end of this hopper is connected with a conveyor housing 61 containing a screw conveyor 62, so that material dumped into the hopper will fall into the conveyor housing. This housing extends radially and the screw 62 is rotated in a direction to discharge the extracted solids toward the center of the apparatus. The conveyor housing has a discharge spout 63 which telescopically extends into a tube 64 which terminates in another conveyor 65 arranged below the bottom 8 of the apparatus and through which the extracted solids are discharged from the apparatus in any suitable manner.

The movable carriage or frame rotates in a counterclockwise direction and the guide tracks or cams 32 and 33 are constructed so that the bottoms 25 of the stationary containers will successively be permitted to swing downwardly on their hinges 28 into substantially upright positions when the hopper 60 of the movable carriage or frame is positioned under the container which is to be dumped. For this purpose the cam tracks 32 and 33 are interrupted or curved downwardly at 68, FIG. 3. After the extracted material has been dropped from a container into the hopper 60, the roller 30 of the container which has just been dumped moves into engagement with an upwardly inclined portion 69 of the movable frame or carriage. This part 69 swings the bottom 25 of the container back into approximately horizontal closing position to confine material to be treated within the container. The tracks 32 and 33 then support the bottom in this closed position until the carriage again reaches the position shown in FIG. 3. After the bottom of a container is in closed position, the spout 55 will then be in position to refill the container with material to be treated.

Treatment of the Material

According to my improved method, batches of material in the various stationary containers are subjected to solvent or miscella sprayed on the material while the same is stationary and free from vibrations or jars, so that fine particles are not shaken through the strainers or sieves through which the miscella passes. Any suitable means may be provided for supplying treating liquid on the material in the containers and in the apparatus shown, by way of example the miscella or solvent is sprayed on the material through a series of spray pipes 70 having discharge nozzles 71 arranged above the baskets or containers, and the liquid after being passed through the material in the baskets or containers drops through the foraminous bottoms 25 into a series of collecting pans 73, 74, 75, 76 and 77 mounted on the revolving frame or carriage. Each of these pans has a drain pipe or conduit 78.

It is of course desired to treat the material in a manner similar to that heretofore employed by means of a counterflow principle whereby the material which has just been deposited in its baskets or containers is treated with miscella which has already acted on other batches of material and which contains a relatively large quantity of extracted material, and then step by step to treat the material with miscella containing less dissolved material and finally treating the material just before its discharge from the apparatus with clear solvent. In order to accomplish this result the material from the collecting pans is delivered to a stationary collecting receptacle 80 divided into a plurality of sections, 80a, 80b, 80c and 80d, each of which constitutes a separate receptacle. This stationary receptacle may for example be divided into four sections by the radial walls 79 and is mounted on the bottom 8 of the apparatus, and in order to make it possible for miscella from different collecting pans on the movable carriage to be conducted to the desired parts of the stationary collecting receptacle 80, a series of annular collecting troughs or rings 81, 82, 83 and 84 is provided which are arranged on top of the collecting receptacle 80. Each collecting trough or ring is connected with one of the compartments of the collecting receptacle 80. For example, as shown in FIGS. 1 and 4, the collecting ring 81 has an opening in the bottom thereof above one of the compartments or divisions of the receptacle 80 and the collecting ring 84 has an opening leading to another compartment of the receptacle 80. The drain pipes or conduits 78 which rotate with the carriage terminate immediately above their stationary annular collecting troughs so that the liquid which has passed through baskets containing material in different stages of extraction may be collected in different sections of the receptacle 80 and passed to other baskets. If desired, two or more pipes 78 may discharge into a single annular trough.

The apparatus is provided with four pumps 86, FIG. 4, which may be located below the apparatus, each of which receives liquid from a different section of the receptacle 80 or directly from one of the troughs through pipes 87 and pass the liquid through three stationary pipes 88, FIG. 1 to three of four annular ring-shaped troughs 89, each of which connects with a discharge pipe 70 leading to a spray nozzle 71. The fourth or outer trough 89 receives fresh solvent through a tube 88a.

The various collector rings or troughs, the compartments of the receptacle 80, the discharge pipes 88 and the troughs 89 may be connected in any desired manner, depending upon the material which is being treated and the manner of treating the same selected by the user of the apparatus. For example, for certain materials it is desirable to treat the fresh material with miscella containing a relatively large percentage of the extracted substance. Consequently this type of miscella is sprayed to the top of the basket 11, into which material to be treated is deposited, to help level out the material fed to this basket and at the same time to begin the extraction cycle of this freshly introduced material. This miscella discharges into the collecting pan 77 below the basket 11 and from there to the collecting ring 81. This miscella contains a large percentage of the extracted material and also contains a certain amount of fines because the mixture of the material with the miscella during the filling of the basket results in washing through the screening of the bottom of the basket a considerable quantity of fine material. In order to reduce as much as possible the fines contained in the miscella, this strong miscella is then fed by one of the pumps 86 to the spray nozzle which passes over the basket 12. By this time the bed of flakes in the basket 12 has settled down so that a good filter bed has been established which will filter out much of the fine material. This strong miscella from the inner collecting trough 81 passes through the discharge hole therein into the sector 80a of the receptacle 80, see FIG. 4, and passes through one of the tubes 87 to the pump 86 which is located at the right of the group of pumps in FIG. 4. From here this strong miscella is passed through one of the pipes 88 to the innermost of the annular troughs 89, FIG. 1, which trough, as clearly shown in FIG. 2, leads through that pipe 70 and spray nozzle 71 which is located over the basket 12. This strong miscella percolating through the basket 12 leaves this basket at full strength and is collected in the pan 76 which drains through its discharge pipe 78 to the outer annular trough 84, FIG. 4, which drains into the sector 80c of the receptacle 80 from where it is pumped by the pump 85, namely one of the farthest to the left of the group of pumps, to an evaporation system.

After the rotating filling spout 55 has filled the stationary compartment 11, it will continue its counterclockwise motion and fill the compartment 10 which has just had its hinged bottom closed by the action of the track portion 69 of the cam track on the roller 30.

It is not deemed necessary to follow through the various connections leading to and from the various compartments, since the paths taken by the miscella will be similar to those described in connection with the containers or baskets 11 and 12 except of course that the various pipes 70 may lead to different annular receiving troughs above the receptacle 80. It will also be obvious that while I have shown four troughs 81, 82, 83 and 84 above the receptacle 80, as many troughs may be provided as may be deemed necessary for the particular material which is being operated upon, in which case the receptacle 80 may also be divided into a different number of sectors or, if desired, different containers may be provided for each of the annular receiving troughs. Similarly, the number of pumps may be varied as well as the troughs 89 which rotate with the carriage of the apparatus. When the movable carriage is in the position shown in the drawings, the material in the containers 13, 14, 15, 16 and 17 is being washed by successively weaker miscella and the material in the compartment 18 is being washed with solvent. The material in the containers 19 and 20 is draining.

Solvent may be introduced into the apparatus in any suitable manner. For example, solvent from a suitable supply, not shown, may be passed to the outermost trough 89 through a pipe 88a from where it passes through a spray pipe and nozzle to the compartment 18, FIG. 2.

The extracted material in the stationary compartment 21 in the positions of the parts shown in the drawing is being dumped into the movable hopper 60 and this movable hopper will then then move to the receptacle 20 and dump the extracted flakes from this container or basket.

The flow of solvent and successively stronger miscella is counter-current through all the stages until the stage 11 adjacent to the filling compartment. The flow of miscella through the material in the containers 10 and 11 however is concurrent in order to filter fines from the miscella.

The drive of the rotary frame or carriage and of the screw conveyor 62 may be effected in any suitable or desired manner. For example, the shaft 52 which carries the pinion 51 meshing with the rack ring 50 may be driven from a sprocket chain 90 through a speed reducer 91. Any suitable means (not shown) may be provided for driving the sprocket chain. The conveyor 62 in the particular construction illustrated is driven from a stationary rack gear or ring 94 which in the construction shown is also secured to the annular support 48 and meshes with a pinion 95 secured on a shaft 96, see FIGS. 1 and 5. The shaft 96 has a relatively large gear 97 mounted thereon which meshes with the small gear 98 secured on a shaft 99 which in turn has a large gear 100 secured thereto which meshes with a pinion 101 on a shaft 102 on which a sprocket gear 103 is also mounted which drives a sprocket chain 104 which meshes with a sprocket mounted on the conveyor shaft. Any other means for driving the conveyor 62 may be provided if desired. This gear train may be mounted on the frame 105 secured to and depending from the hopper 60.

106 represents a drain pipe through which any liquid collecting on the bottom wall 8 may be removed from the apparatus.

The process described has the advantage that the material which is being treated and which of course is relatively heavy, remains stationary throughout the extraction. This results in a material reduction in the power required to operate the apparatus and in the wear of parts of the same as compared with apparatus in which the material while being treated is moved from one treating station to another, in that the carrier in the apparatus described is relatively light and supports only a small portion of the material under treatment during a very short interval of time while it is dumped from a container or basket into the hopper on the carriage, from which it is quickly discharged from the apparatus. The revolving carriage or frame does not carry any substantial weight of material while it is being deposited in the baskets or containers since the nozzle 55 serves mainly to guide the material to be treated into the stationary baskets or containers. This relatively small weight of the carriage or movable frame also makes it possible to construct the apparatus at less cost and of larger size and capacity than other types of apparatus now employed for this purpose.

The process described has the further advantage that since the material to be treated remains stationary during the entire treatment, it is not subject to vibrations or jars such as result when the material itself is being transported from one treating station to another. This results in a superior miscella which is relatively free from fines and therefore easier to handle in the evaporation system.

While this process has been described mainly for use in connection with the extraction of oils or fats from oil bearing vegetable or animal products, yet it will be understood that the process and apparatus may also be used for the treatment of other materials. While it is preferred to have the carriage or movable frame move about a fixed axis in a circular path, yet it will be understood that the baskets or holders and the travel of the carriage may be arranged in a non-circular path.

It will be understood that various changes in the details, materials and arrangements of parts, which have been herein described and illustrated in order to explain the nature of the invention, may be made by those skilled in the art, within the principle and scope of the invention as expressed in the appended claims.

I claim:

1. A continuous solvent extraction process for obtaining oil and fats from animal and vegetable material while said material is in stationary positions, including the steps of depositing distinct batches of material to be treated into containers stationarily arranged in a circular, substantially horizontal series, moving discharge conduits continuously over said stationary containers and discharging solvent liquids of different concentrations containing successively less amounts of the extracted substance until pure solvent is utilized through different conduits, whereby batches of material while held continuously stationary are successively subjected to liquids of different concentrations, removing a batch of material from its container after it has been sprayed by the solvent liquids of different concentrations and replacing it with a batch of untreated material.

2. A continuous solvent extraction process for treating animal and vegetable material to extract oils and fats therefrom, including the steps of continuously positioning distinct batches of the material to be treated in fixed stationary positions in an endless series, moving solvent discharge devices over the batches in said endless path and discharging solvents of different concentrations containing successively less amounts of the extracted substance until pure solvent is utilized to said batches from said devices while the material in said batches remains continuously stationary, continuously moving miscella collecting devices and collecting from said batches miscella which has passed through the same, passing the miscella thus collected to said discharge devices passing over other batches, and discharging the same to such other batches, removing the treated batches of the material successively from different portions of said series, and continuously replacing the removed batches with batches of fresh material to be treated without interrupting the treatment of previously positioned batches.

3. A continuous solvent extraction process for extracting oils and fats from animal and vegetable material including the steps of positioning distinct batches of the material to be treated in fixed positions in a circle, moving spraying devices in a concentric circle over said batches and without moving said batches and while the material in said batches remains continuously stationary, spraying solvents which have passed through other batches from said devices on more recently positioned batches and finally spraying clear solvent on said batches, and dumping fully treated batches successively from different portions of said circle without interrupting the process, and replacing the removed batches with batches of material to be treated.

4. A continuous solvent extraction process for extracting oils and fats from animal and vegetable material including the steps of depositing distinct batches of material to be treated into containers stationarily arranged in a circular, substantially horizontal series, moving a plurality of conduits in a circular path over said series of batches while the material in said batches remains continuously stationary, supplying said conduits with solvents of different concentrations for successively treating said stationary batches with solvents of different concentrations during the successive passage of said conduits over said batches, said solvents containing successively less amounts of the extracted substances until finally pure solvent is utilized, and successively emptying containers of treated material at successively different portions of said circular series, and supplying said emptied containers with fresh material to be treated.

References Cited in the file of this patent
UNITED STATES PATENTS

| | | |
|---|---|---|
| 2,680,754 | Stapelberg | June 8, 1954 |
| 2,707,712 | Demper et al. | May 3, 1955 |
| 2,726,939 | Andrews | Dec. 13, 1955 |